US012743597B2

(12) United States Patent
Hejl et al.

(10) Patent No.: US 12,743,597 B2
(45) Date of Patent: Sep. 22, 2026

(54) SYSTEMS, APPARATUSES, METHODS, AND COMPUTER PROGRAM PRODUCTS FOR AUTOMATIC SWITCHING OF OBJECT DETECTION MODES

(71) Applicant: Hand Held Products, Inc., Charlotte, NC (US)

(72) Inventors: Benjamin Hejl, Charlotte, NC (US); David M Wilz, Sr., Charlotte, NC (US); Erik Van Horn, Charlotte, NC (US); Abhishek Dipakkumar Golwala, Charlotte, NC (US); Thomas M. Haggerty, Charlotte, NC (US)

(73) Assignee: Hand Held Products, Inc., Charlotte, NC (US)

( * ) Notice: Subject to any disclaimer, the term of this patent is extended or adjusted under 35 U.S.C. 154(b) by 94 days.

(21) Appl. No.: 18/439,240

(22) Filed: Feb. 12, 2024

(65) Prior Publication Data

US 2024/0303453 A1 Sep. 12, 2024

(30) Foreign Application Priority Data

Mar. 6, 2023 (IN) ............................ 202311014886

(51) Int. Cl.
*G06K 7/14* (2006.01)
*G06V 10/143* (2022.01)
*H04N 23/11* (2023.01)

(52) U.S. Cl.
CPC ......... *G06K 7/1443* (2013.01); *G06V 10/143* (2022.01); *H04N 23/11* (2023.01); *G06V 2201/07* (2022.01)

(58) Field of Classification Search
CPC .. G06V 2201/07; G06V 10/143; H04N 23/11; G06K 7/1443
See application file for complete search history.

(56) References Cited

U.S. PATENT DOCUMENTS 5,837,989 A * 11/1998 Rockstein ................ G06K 7/10 235/462.43
6,860,427 B1 * 3/2005 Schmidt ............ G06K 7/10851 235/462.14
8,469,272 B2 6/2013 Kearney
8,590,792 B2 * 11/2013 Tan .................... G06K 7/10752 235/462.31

(Continued)

OTHER PUBLICATIONS

Extended European Search Report Mailed on Aug. 12, 2024 for EP Application No. 24157611, 6 page(s).

*Primary Examiner* — Daniel I Walsh
(74) *Attorney, Agent, or Firm* — Alston & Bird LLP

(57) ABSTRACT

Systems, apparatuses, methods, and computer products for automatic switching of object detection modes are provided, including for switching of object detection modes of an indicia reader. For example, an indicia reader of a barcode scanner may be in an environment where a background is detected by one or more infrared object detection modes. The detection of the background but not an object with an indicia may result in the indicia reader continuously seeing the background. In accordance with the present disclosure, an indicia reader may automatically switch between a plurality of object detection modes, which may include deactivating one or more components, modules, and/or circuitry of the indicia reader.

17 Claims, 4 Drawing Sheets

(56) References Cited

U.S. PATENT DOCUMENTS 8,773,719 B2 7/2014 Baba et al.
10,460,224 B1 * 10/2019 Asthana ............... G06K 7/1097
11,314,306 B2 4/2022 Kosugi
12,439,167 B1 * 10/2025 Xu ......................... H04N 25/20
2002/0179711 A1 * 12/2002 Hileman ............ G06K 7/10861 235/454
2004/0046029 A1 * 3/2004 Hudrick ............. G06K 7/10851 235/462.31
2005/0082371 A1 4/2005 Schmidt et al.
2006/0219792 A1 * 10/2006 Zhu .................... G06K 7/10881 235/462.06
2007/0181689 A1 * 8/2007 Kotlarsky .......... G06K 7/10722 235/462.11
2007/0215706 A1 * 9/2007 Kotlarsky .......... G06K 7/10851 235/462.07
2008/0006698 A1 * 1/2008 Kotlarsky .......... G06K 7/10722 235/462.42
2008/0029603 A1 2/2008 Harris
2008/0105745 A1 * 5/2008 Lei ..................... G06K 7/10722 235/462.1
2008/0105746 A1 * 5/2008 Lei ..................... G06K 7/10722 235/462.11
2010/0127828 A1 * 5/2010 Connolly ............. G06K 7/0008 340/10.1
2011/0296217 A1 * 12/2011 Nishimura ............ G06F 1/3215 713/323
2012/0181338 A1 * 7/2012 Gao ......................... G06K 7/12 235/455
2012/0228382 A1 * 9/2012 Havens .............. G06K 7/10792 235/462.1
2013/0006112 A1 * 1/2013 Vardy .................. A61B 5/0059 600/443
2013/0043312 A1 * 2/2013 Van Horn .......... G06K 7/10831 235/462.27
2013/0306730 A1 * 11/2013 Brady ................ G06K 7/10792 235/455
2013/0313325 A1 * 11/2013 Wilz, Sr. ............ G06K 7/10821 235/462.25
2014/0145066 A1 * 5/2014 Geaghan ............... G06F 3/0317 250/206.1
2016/0132707 A1 * 5/2016 Lindbo .............. G06K 7/10861 235/462.44
2018/0101708 A1 * 4/2018 Gao ................... G06K 7/10811
2019/0294838 A1 * 9/2019 Drzymala .......... G06K 7/10722
2020/0344427 A1 * 10/2020 Glasmacher ........... H04N 7/183
2021/0366142 A1 * 11/2021 Grossinger .......... H04N 13/254
2022/0019777 A1 * 1/2022 Jang ......................... G06N 3/04
2023/0010947 A1 * 1/2023 Wang ..................... G09G 5/377
2023/0109799 A1 * 4/2023 Gurevich ............... G06K 7/109 235/472.01
2023/0267439 A1 * 8/2023 Handshaw ............ G01S 7/4865 705/23
2023/0336847 A1 * 10/2023 Alakarhu ............... H04N 23/56
2024/0070415 A1 * 2/2024 Modin .................... G01S 13/08
2024/0073219 A1 * 2/2024 Maizels .................. G10L 13/00
2024/0289925 A1 * 8/2024 Saheli ....................... G06T 5/50
2024/0303453 A1 * 9/2024 Hejl ................... G06K 7/10801
2024/0406548 A1 * 12/2024 Barkan ................ H04N 23/651
2026/0003421 A1 * 1/2026 Cho ........................ G06F 3/005

* cited by examiner

SYSTEMS, APPARATUSES, METHODS, AND COMPUTER PROGRAM PRODUCTS FOR AUTOMATIC SWITCHING OF OBJECT DETECTION MODES

CROSS-REFERENCE TO RELATED APPLICATIONS

This application claims priority pursuant to 35 U.S.C. 119(a) to Indian application Ser. No. 20/231,1014886, filed Mar. 6, 2023, which application is incorporated herein by reference in its entirety.

TECHNOLOGICAL FIELD

Example embodiments of the present disclosure relate generally to systems, apparatuses, methods, and computer program products with multiple object detection modes, and more particularly to automatic switching of object detection modes in indicia readers.

BACKGROUND

An indicia reader, such as a barcode scanner, is an electronic system and/or apparatus that may capture information stored in indicia, such as a barcode. Indicia readers have found application in a myriad of applications and environments. Indicia readers have used object detection to determine when an object is present in a field of view. In indicia readers, however, it remains a challenge to detect objects while operating indicia readers in an efficient manner.

The inventors have identified numerous areas of improvement in the existing technologies and processes, which are the subjects of embodiments described herein. Through applied effort, ingenuity, and innovation, many of these deficiencies, challenges, and problems have been solved by developing solutions that are included in embodiments of the present disclosure, some examples of which are described in detail herein.

BRIEF SUMMARY

Various embodiments described herein relate to systems, apparatuses, methods, and computer program products for automatic switching of object detection modes.

In accordance with some embodiments of the present disclosure, an example indicia reader is provided. In some embodiments the indicia reader comprises at least one processor and at least one non-transitory memory comprising program code, the at least one non-transitory memory and the program code are configured to, with the at least one processor, cause the indicia reader to: determine a first infrared object detection mode of a plurality of infrared object detection modes for the indicia reader, wherein each infrared object detection mode is associated with a respective threshold and a respective time period; switch to the first infrared object detection mode, wherein the first infrared objection detection mode is associated with a first range that is associated with a first threshold of infrared illumination received at an infrared illumination sensor; detect at least the first threshold of illumination via the illumination sensor for a first period of time; switch, based on the detection of the first threshold of illumination for the first period of time, to a second infrared object detection mode of the plurality of infrared object detection modes, wherein the second infrared objection detection mode is associated with a second range that is associated with a second threshold of infrared illumination received at the infrared illumination sensor; detect at least the second threshold of illumination via the illumination sensor for a second period of time;

switch, based on the detection of each respective threshold for the respective time period of each respective infrared objection mode, to an optical object detection mode; deactivate an infrared illumination source and infrared illumination sensor; and detect, via an optical image sensor, an object comprising an indicia.

In some embodiments, the first range is a longer distance than the second range.

In some embodiments, the at least one non-transitory memory and the program code are further configured to, with the at least one processor, cause the indicia reader to: activate, based on the detection of the object comprising an indicia, the infrared illumination source and infrared illumination sensor; and switch to the first infrared object detection mode.

In some embodiments, the at least one non-transitory memory and the program code are further configured to, with the at least one processor, cause the indicia reader to: capture, in response to a detection of the object, an image of the object including an indicia; and decode the indicia In some embodiments, the indicia reader further comprises a trigger; and the at least one non-transitory memory and the program code are further configured to, with the at least one processor, cause the indicia reader to: determine, responsive to an actuation of the trigger, a last object detection mode; capture, responsive to the actuation of the trigger, an image; and switch, after capturing the image, to the last object detection mode.

In some embodiments, the plurality of infrared object detection modes includes a third infrared objection detection mode; and the at least one non-transitory memory and the program code are further configured to, with the at least one processor, cause the indicia reader to: switch, prior to switching to an optical detection mode and based on the detection of the second threshold of illumination for the second period of time, to a third infrared object detection mode of the plurality of infrared object detection modes, wherein the third infrared objection detection mode is associated with a third range that is associated with a third threshold of infrared illumination received at the infrared illumination sensor; and detect at least the third threshold of illumination via the illumination sensor for a third period of time.

In some embodiments, the at least one non-transitory memory and the program code are further configured to, with the at least one processor, cause the indicia reader to switch between a handheld mode and a presentation mode based on a signal from a contact sensor.

In accordance with other embodiments of the present disclosure, an example computer-implemented method is provided. In some embodiments, the computer-implemented method comprises: determining a first infrared object detection mode of a plurality of infrared object detection modes for an indicia reader, wherein each infrared object detection mode is associated with a respective threshold and a respective time period; switching to the first infrared object detection mode, wherein the first infrared objection detection mode is associated with a first range that is associated with a first threshold of infrared illumination received at an infrared illumination sensor; detecting at least the first threshold of illumination via the illumination sensor for a first period of time; switching, based on the detection of the first threshold of illumination for the first period of time, to a second infrared object detection mode of the plurality of infrared object detection modes, wherein the second infrared objection detection mode is associated with a second range that is associated with a second threshold of infrared illumination received at the infrared illumination sensor; detecting at least the second threshold of illumination via the illumination sensor for a second period of time; switching, based on the detection of each respective threshold for the respective time period of each respective infrared objection mode, to an optical object detection mode; deactivating an infrared illumination source and infrared illumination sensor; and detecting, via an optical image sensor, an object comprising an indicia In some embodiments, the first range is a longer distance than the second range.

In some embodiments, the computer-implemented method further comprises: activating, based on the detection of the object comprising an indicia, the infrared illumination source and infrared illumination sensor; and switching to the first infrared object detection mode.

In some embodiments, the computer-implemented method further comprises: capturing, in response to a detection of the object, an image of the object including an indicia; and decoding the indicia.

In some embodiments, the computer-implemented method further comprises: determining, responsive to an actuation of a trigger of the indicia reader, a last object detection mode; capturing responsive to the actuation of the trigger, an image; and switching, after capturing the image, to the last object detection mode.

In some embodiments, the plurality of infrared object detection modes includes a third infrared objection detection mode; and the computer implemented method further comprises: switching, prior to switching to an optical detection mode and based on the detection of the second threshold of illumination for the second period of time, to a third infrared object detection mode of the plurality of infrared object detection modes, wherein the third infrared objection detection mode is associated with a third range that is associated with a third threshold of infrared illumination received at the infrared illumination sensor; and detect at least the third threshold of illumination via the illumination sensor for a third period of time.

In some embodiments, the computer-implemented method further comprises: switching between a handheld mode and a presentation mode based on a signal from a contact sensor.

In accordance with some other embodiments of the present disclosure, an example computer program product is provided. In some embodiments, the computer program product comprises at least one non-transitory computer-readable storage medium having computer-readable program code portions stored therein, the computer-readable program code portions comprising an executable portion configured to: determine a first infrared object detection mode of a plurality of infrared object detection modes for an indicia reader, wherein each infrared object detection mode is associated with a respective threshold and a respective time period; switch to the first infrared object detection mode, wherein the first infrared objection detection mode is associated with a first range that is associated with a first threshold of infrared illumination received at an infrared illumination sensor; detect at least the first threshold of illumination via the illumination sensor for a first period of time; switch, based on the detection of the first threshold of illumination for the first period of time, to a second infrared object detection mode of the plurality of infrared object detection modes, wherein the second infrared objection detection mode is associated with a second range that is associated with a second threshold of infrared illumination received at the infrared illumination sensor; detect at least the second threshold of illumination via the illumination sensor for a second period of time; switch, based on the detection of each respective threshold for the respective time period of each respective infrared objection mode, to an optical object detection mode; deactivate an infrared illumination source and infrared illumination sensor; and detect, via an optical image sensor, an object comprising an indicia.

In some embodiments, the first range is a longer distance than the second range.

In some embodiments, the computer-readable program code portions further comprise the executable portion configured to: activate, based on the detection of the object comprising an indicia, the infrared illumination source and infrared illumination sensor; and switch to the first infrared object detection mode.

In some embodiments, the computer-readable program code portions further comprise the executable portion configured to: capture, in response to a detection of the object, an image of the object including an indicia; and decode the indicia.

In some embodiments, the computer-readable program code portions further comprise the executable portion configured to: determine, responsive to an actuation of a trigger of the indicia reader, a last object detection mode; capture responsive to the actuation of the trigger, an image; and switch, after capturing the image, to the last object detection mode.

In some embodiments, the plurality of infrared object detection modes includes a third infrared objection detection mode; and the computer-readable program code portions further comprise the executable portion configured to: switch, prior to switching to an optical detection mode and based on the detection of the second threshold of illumination for the second period of time, to a third infrared object detection mode of the plurality of infrared object detection modes, wherein the third infrared objection detection mode is associated with a third range that is associated with a third threshold of infrared illumination received at the infrared illumination sensor; and detect at least the third threshold of illumination via the illumination sensor for a third period of time.

The above summary is provided merely for purposes of summarizing some example embodiments to provide a basic understanding of some aspects of the disclosure. Accordingly, it will be appreciated that the above-described embodiments are merely examples and should not be construed to narrow the scope or spirit of the disclosure in any way. It will also be appreciated that the scope of the disclosure encompasses many potential embodiments in addition to those here summarized, some of which will be further described below. It should be readily appreciated that the embodiments of the systems, apparatuses, methods, and computer program products described herein may be configured in various additional and alternative manners in addition to those expressly described herein.

BRIEF SUMMARY OF THE DRAWINGS

Figure 1:
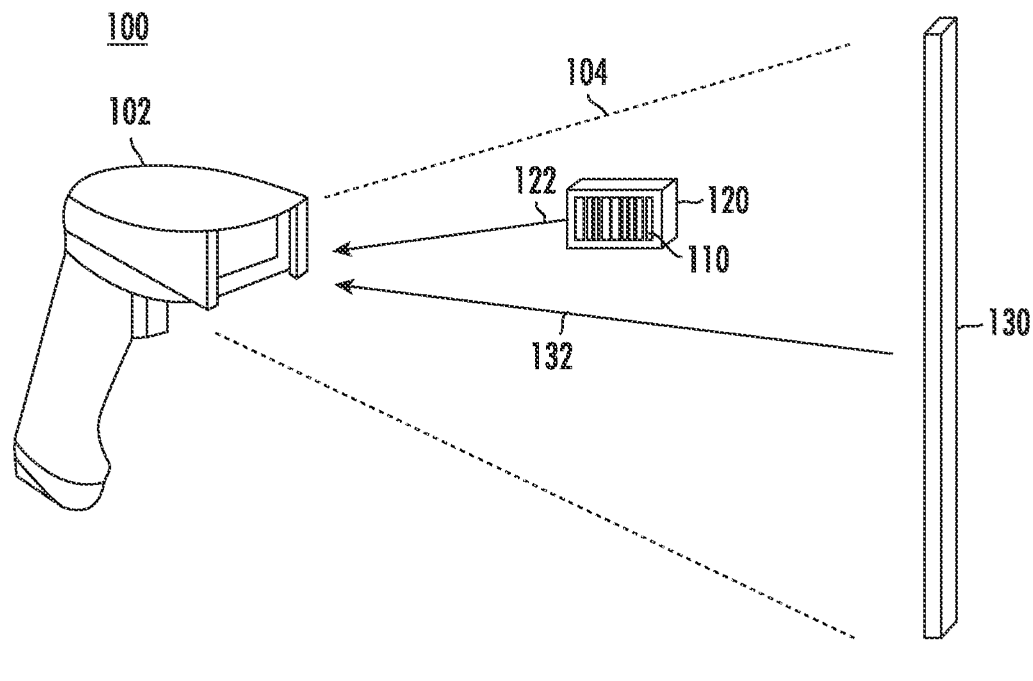
Figure 2:
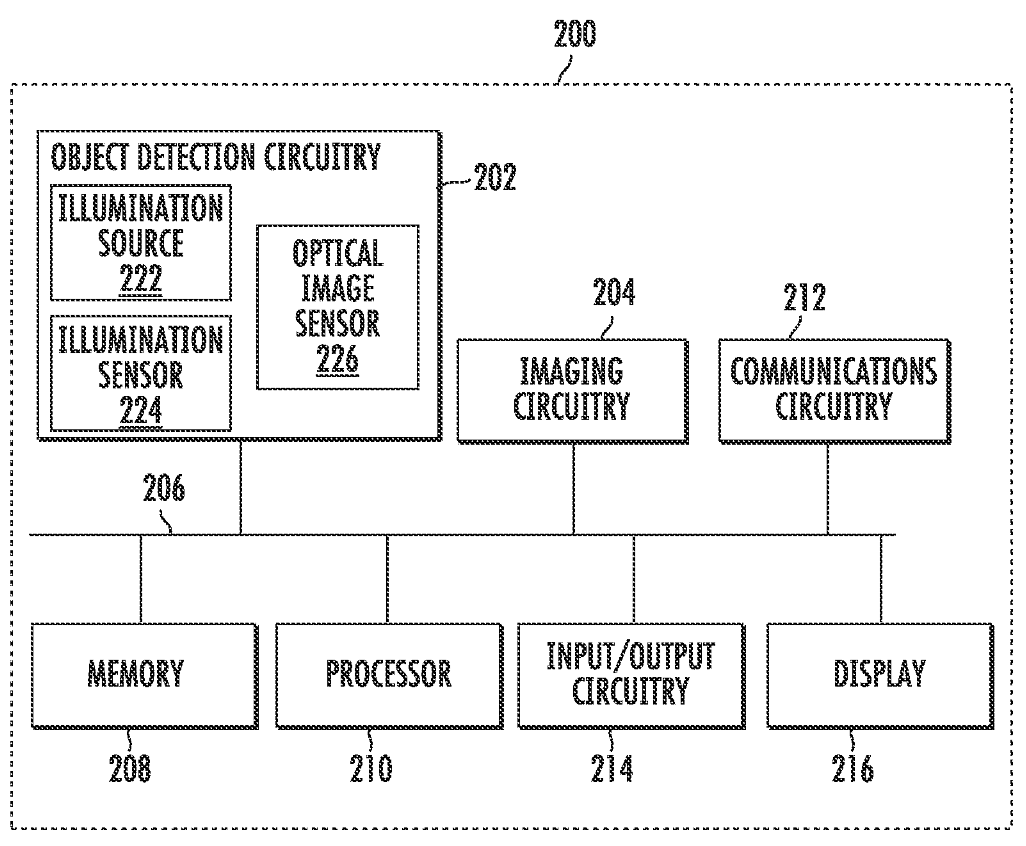
Figure 3:
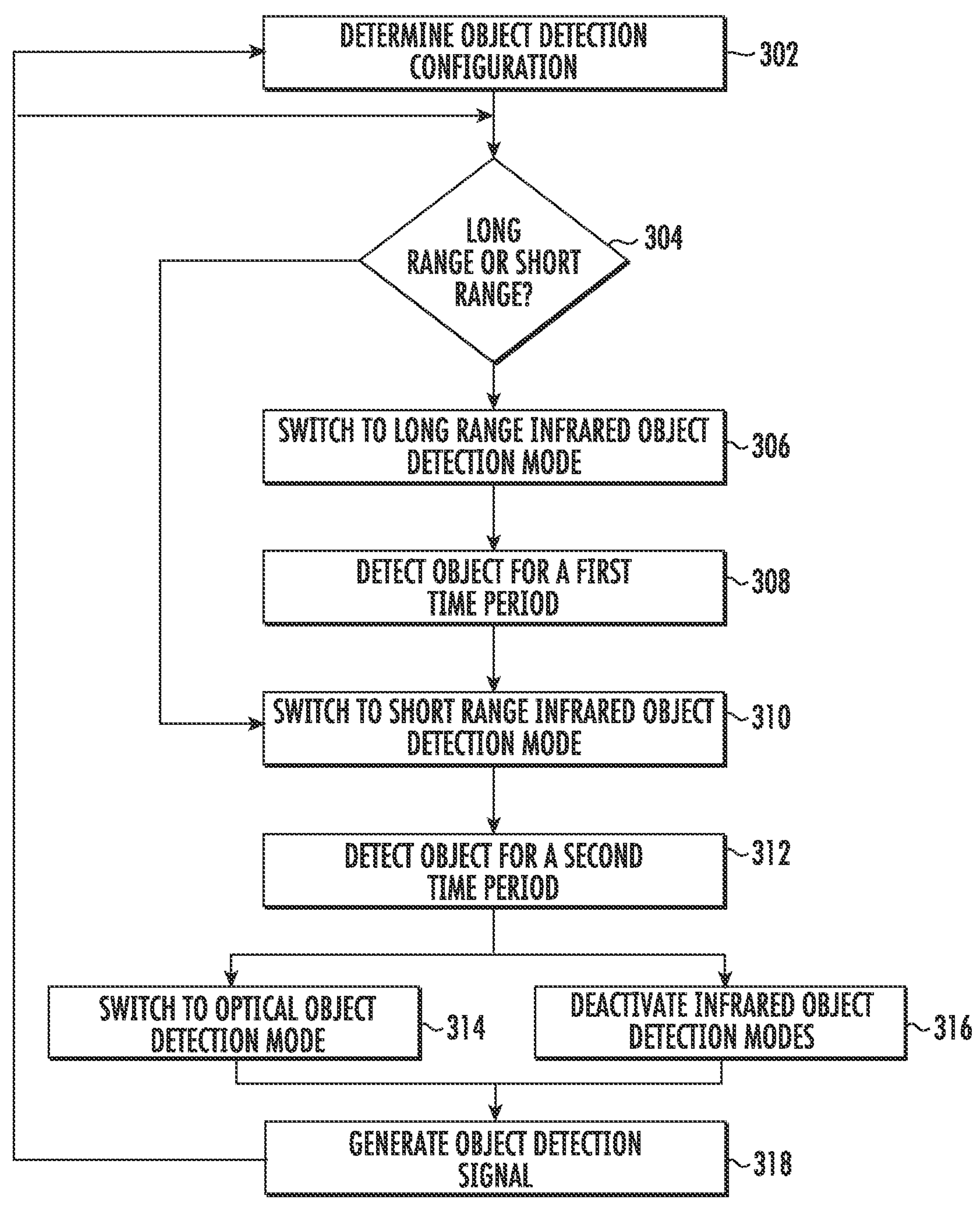
Figure 4:
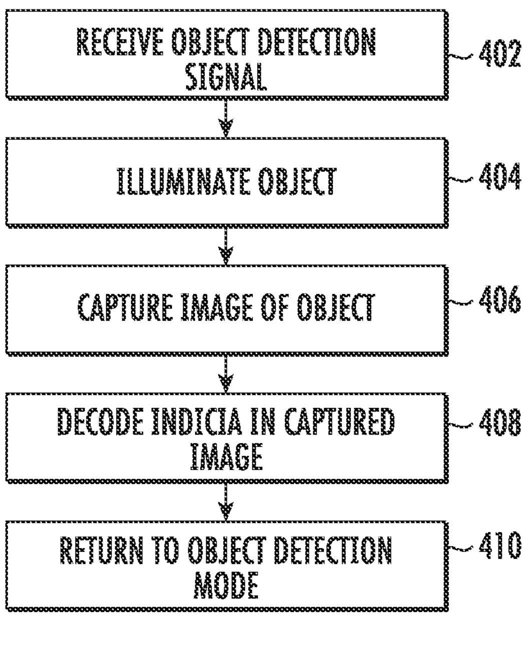

Having thus described certain example embodiments of the present disclosure in general terms, reference will now be made to the accompanying drawings, which are not necessarily drawn to scale, and wherein:

FIG. 1 illustrates an exemplary environment for operation of an indicia reader in accordance with an example embodiment of the present disclosure;

FIG. 2 illustrates an example block diagram of an apparatus of an indicia reader in accordance with example embodiments of the present disclosure;

FIG. 3 illustrates an example process for detecting an object in accordance with example embodiments of the present disclosure; and FIG. 4 illustrates an example process for operating an indicia reader in accordance with example embodiments of the present disclosure.

DETAILED DESCRIPTION

Some embodiments of the present disclosure will now be described more fully herein with reference to the accompanying drawings, in which some, but not all, embodiments of the disclosure are shown. Indeed, various embodiments of the disclosure may be embodied in many different forms and should not be construed as limited to the embodiments set forth herein; rather, these embodiments are provided so that this disclosure will satisfy applicable legal requirements. Like reference numerals refer to like elements throughout.

As used herein, terms such as "front," "rear," "top," etc. are used for explanatory purposes in the examples provided below to describe the relative position of certain components or portions of components.

As used herein, the term "comprising" means including but not limited to and should be interpreted in the manner it is typically used in the patent context. Use of broader terms such as comprises, includes, and having should be understood to provide support for narrower terms such as consisting of, consisting essentially of, and comprised substantially of.

The phrases "in one embodiment," "according to one embodiment," "in some embodiments," "in various embodiments," and the like generally mean that the particular feature, structure, or characteristic following the phrase may be included in at least one embodiment of the present disclosure and may be included in more than one embodiment of the present disclosure (importantly, such phrases do not necessarily refer to the same embodiment).

The word "example" or "exemplary" is used herein to mean "serving as an example, instance, or illustration." Any implementation described herein as "exemplary" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that a specific component or feature is not required to be included or to have the characteristic. Such a component or feature may be optionally included in some embodiments, or it may be excluded.

The use of the term "circuitry" as used herein with respect to components of an apparatus should be understood to include particular hardware configured to perform the functions associated with the particular circuitry as described herein. The term "circuitry" should be understood broadly to include hardware and, in some embodiments, software for configuring the hardware. For example, in some embodiments, "circuitry" may include processing circuitry, storage media, network interfaces, input/output devices, and the like. In some embodiments, other elements may provide or supplement the functionality of particular circuitry.

The term "electronically coupled," "electronically coupling," "electronically couple," "in communication with," "in electronic communication with," or "connected" in the present disclosure refers to two or more elements, modules, or components being connected through wired means and/or wireless means, such that signals, electrical voltage/current, data and/or information may be transmitted to and/or received from these elements or components.

In the present disclosure, the term "indicia" refers to one or more machine-readable/machine-decodable codes that represent data and information in a visual form that may include, but not limited to, patterns, lines, numbers, letters, and/or the like. Examples of indicia may include, but are not limited to, one-dimensional (1D) barcodes (e.g., UPC, Code 39, Code 128, etc.), two-dimensional (2D) barcodes (Data Matrix, Quick Response (QR), etc.), information-based indicia, Aztec codes, texts (e.g., optical character recognition characters in text or 2D image, etc.), and/or the like. In some embodiments, indicia may be affixed, printed, or otherwise attached to items and/or objects to provide information regarding the item or the object in a machine-readable/machine-decodable format.

OVERVIEW

Indicia readers may be utilized in multiple applications, including both as handheld indicia readers and fixed mount indicia readers. A handheld indicia reader may be held in a user's hand and the user may actuate a trigger to cause the indicia reader to capture an image when an object is in the indicia reader's field of view. A fixed mount indicia reader does not necessarily refer to a permanently mounted indicia reader but rather to an indicia reader that may be located in a fixed position, which may be permanent or may be temporary. For example, indicia readers in fixed positions may include a handheld indicia reader that is placed in a cradle or base station. In some embodiments, an indicia reader may include a handheld sensor (e.g., contact sensor, etc.) and/or a mounting sensor (e.g., contact sensor, etc.) to determine when the indicia reader is being used as a handheld mode or as a fixed mode. Once in such a cradle and/or base station, the indicia reader may utilize a presentation mode where an object may be presented to the indicia reader, which may include the object being brought into or passing into the field of view of the indicia reader. The detection of an object entering into an indicia reader's field of view may trigger or activate one or more operations of the indicia reader, such as scanning a barcode of an object.

In either the handheld mode or presentation mode, an indicia reader may detect an object utilizing a plurality of object detection modes. For example, and as described further herein, object detections modes may include infrared object detection modes, optical object detection modes, and the like. Once an object is detected, the indicia reader may proceed to one or more operations associated with capturing an image of the object, including one or more indicia on the object. From the captured image, the indicia reader may decode the indicia.

While object detection modes may detect an object with an indicia, object detection modes may also detect objects that do not include indicia, such as one or more backgrounds. A background detected may vary depending on an application of the indicia reader. In a first example of a sorting facility with a conveyor transporting packages into and out of the field of view of an indicia reader, the background may be a wall that the indicia reader is aimed at. In another example of a grocery store or a department store with an indicia reader mounted in a cradle or base station on a checkout desk, the background may be a top of the checkout desk. While these backgrounds may be considered objects, the detection of these background objects is a false positive in that the background does not change and does not include an indicia. Moreover, in various embodiments, and as a background object is detected, the indicia reader may be continuously generating signals that an object is detected and/or continuously capturing images of these background objects. In such embodiments the indicia reader may be continuously using power while objects with indicia are not in the field of view despite objects being detected. Various embodiments of indicia readers with object detection may utilize a plurality of object detection modes, including some object detection modes that may consume more power than others.

In the present disclosure, an indicia reader may utilize a plurality of object detection modes to detect an object. As described herein, when a background object is detected in one or more of the plurality of object detection modes, the indicia reader may automatically switch to another object detection mode. The indicia reader may also deactivate, disable, power down, or the like certain components of the indicia reader associated with one or more of the plurality of object detections modes that are detecting the background. Such deactivation(s) may reduce the number of false positive identifications of an object being present. Additionally or alternatively, such deactivations may save power and, thus, improve the battery life and/or power consumption of the indicia reader. Additionally or alternatively, such deactivations may improve the useful life of the indicia reader by reducing the usage and/or number of activations of deactivated components, which among other things may prevent wear and tear of these components.

In various embodiments, the deactivation of one or more of the components of the indicia reader and/or one or more of the plurality of object detection modes does not deactivate all of the object detection modes. For example, object detection modes associated with infrared light may be disabled while object detection modes associated with image capture may be enabled.

Once an object is detected, such as with one of the currently active object detection modes, an image of an object with an indicia may be captured and the indicia decoded. In various embodiments, object detection circuitry may communicate an object is detected by generating and transmitting a signal to imaging circuitry of the indicia reader. On receiving the object detected signal, the imaging circuitry may capture an image and decode an image to process an indicia.

It should be readily appreciated that the embodiments of the systems, apparatuses, methods, and computer programming products described herein may be configured in various additional and alternative manners in addition to those expressly described herein.

EXAMPLE SYSTEMS AND APPARATUSES

Embodiments of the present disclosure provide a plurality of technical improvements and resolve a plurality of technical problems. For example, embodiments described herein may allow for reduction in power consumption of indicia readers, particularly those that may utilize multiple object detection modes.

FIG. 1 illustrates an exemplary environment for operation of an indicia reader in accordance with an example embodiment of the present disclosure. Specifically, FIG. 1 illustrates and environment 100 with an indicia reader 102 operating to decode an indicia 110 on an object 120. In various embodiments, an indicia reader 102 may have a field of view 104. The indicia reader may operate to detect an object 120 as it enters into the indicia reader's 102 field of view 104. An object 120 may be detected as described herein. Once an object 120 is detected, the indicia reader 102 may operate to capture an image of the object 120, particularly the indicia 110, and to decode the indicia 110. In various embodiments, the indicia reader 102 may also include a trigger, button, touchscreen display button, or the like for a user to manually actuate. The actuation of the trigger may cause the indicia reader 102 to operate to perform one or more operations associated with detecting an object, capturing an image, and/or decoding the indicia.

In various embodiments, object detection circuitry may be utilized to detect an object and generate a signal that an object is present. Such a signal may be a binary signal (e.g., a 0 or 1) representing if an object is not present or if an object is present or vice-versa. Such a binary signal may be a continuous output that is monitored, such as for a change in state. Alternatively or additionally, an object present signal may be included in a data object that is generated and transmitted to one or more other portions of the indicia reader 102 when an object is present.

In various embodiments, an indicia reader may be operated in a fixed position such that the field of view 104 does not change while an object 120 may move into and out of the field of view 104 of the indicia reader 102. The field of view may include a background 130, which may not change over time or may not change over a time period of length that is longer than the time period for which an object 120 may enter and leave the indicia reader's 102 field of view 104.

The background 130 may, however, be detected by one or more operations associated with the indicia reader's 102 detection of an object 120. For example, an indicia reader 102 may include one or more object detection modes. One or more object detection modes may be associated with a light based detection mode, such as one or more infrared object detection modes. One or more other object detection modes may be based on one or more optical image(s), such as one or more optical object detection modes.

In an embodiment with a light based object detection mode using infrared light, the indicia reader 102 may use one or more illumination sources (e.g., infrared LEDs) to generate light that is transmitted into the field of view 104 of the indicia reader 102. In an example of an infrared illumination object detection mode, the infrared light and infrared light sensing may be performed by infrared circuitry of the indicia reader 102, which is described further herein. Reflections 122 of the transmitted infrared light may be used to determine the presence of an object 120.

For example, an infrared illumination source may generate an infrared light that is transmitted towards an object 120 and the object's reflection(s) 122 may reflect towards the indicia reader 102. The indicia reader 120 may receive such object reflection(s) 122 at an illumination sensor (e.g., a photodiode, etc.) and determine that an object is present. The presence of an object may be based on the strength of the reflection(s) 122, which may be determined based on an amplitude of a signal generated by the illumination sensor. However, in various embodiments more than a target object 120 may reflect the infrared light. For example, a background 130 may reflect one or more background reflections 132. The indicia reader 102 may receive such background reflection(s) 132, such as with the illumination sensor, and incorrectly determine that an object is present.

In various embodiments, infrared object detection modes may allow for detection of an object at one or more ranges. For example, there may be two ranges, three ranges, four ranges, etc. The use of ranges may be used by the indicia reader to trigger one or more operations or to generate a signal that may distinguish where an object is in relationship to the indicia reader. In various embodiments with two ranges, the two ranges may be referred to as a long range and a short range. The long range being associated with a greater distance from the indicia reader than the short range. For example, the long range may be associated with 7 to 8 inches away from the indicia reader and the short range may be 3 to 4 inches away from the indicia reader. In various embodiments with additional ranges, each range may have a different distance. The distances for the ranges may have no overlap or may have some overlap.

The determination of a range by an indicia reader may be associated with a reflection received from an object at the indicia reader, such as at an infrared illumination sensor. In various embodiments, an object 120 located closer to the indicia reader 102 will return a greater amount of light with a reflection 122 than the same object 120 located further away from the indicia reader 102. The greater the amount of light received in a reflection 122 may result in an illumination sensor generating a signal with a higher amplitude. Thus the amplitude of a signal generated by an illumination sensor may be indicative of the location of the object.

For example, and with an indicia reader 102 with two ranges of a long range and a short range, the amount and/or strength of reflections 122 from the object 120 at the long range will be less than the amount and/or strength of reflections 122 from the object 120 at the short range. As the amount of light in the reflections 122 increases as an object is closer, an indicia reader 102 may utilize these differences to determine when an object is present in a range. In this example, an object 120 in the short range will generate a signal from an illumination sensor with a greater magnitude and/or amplitude than the object 120 in the long range will generate. By comparing these magnitudes to predetermined thresholds, the range of an object may be determined. In various embodiments, the threshold for an object 120 located in a first range (e.g., a long range) will be lower than the object 120 located in the second range (e.g., a short range), and an object 120 located in either the first range and/or second will be associated with reflections having a magnitude that is higher than receiving no reflections or reflections 132 from a background located beyond either the first and/or second range.

A threshold may be an absolute value or a percentage, such as a percentage of light generated by the illumination source. For example, a first threshold associated with a short range may have a threshold of 30%, which may be 30% of the illumination generated by the infrared illumination source. A second threshold associated with a long range may have a threshold of 15%, which may be 15% of the illumination generated by the infrared illumination source. In various embodiments, an objection detection mode may be associated with only one range and the indicia reader 102 may switch between object detection modes. Thus, if an indicia reader is operating an infrared object detection mode for a short range and a reflection 122 generates a signal with a magnitude having a percentage return at or above 30%, then the indicia reader 102 will generate a signal of detecting an object for the short range. If an indicia reader 102 is operating an infrared object detection mode for a long range and the reflection 122 generates a signal with a percentage return at or above 15%, then the indicia reader 102 will generate a signal with detecting an object for a long range. The switching of the object detection modes may allow the indicia reader 102 to disregard objects at longer range that may generate a reflection, such as a background 130 generating a reflection 132.

The reflections (e.g., 122, 132) of an object may be based on, among other things, the reflectivity of the surface of the object (e.g., 120, 130). For example, a background 132 with a wood surface (e.g., on a desk) would have weaker reflections 132 than a background 130 of a metal surface (e.g., at a checkout kiosk). The expected reflectivity of an object may be incorporated into one or more settings of the indicia reader 102, such as during calibration. Calibration may include the setting of one or more thresholds, including one or more thresholds for each of one or more object detection modes. Alternatively or additionally, a user interface may allow a user to adjust a setting that may indicate if an object and/or background is highly reflective. Such settings may apply a factor or multiplier to the thresholds used to determine if an object is present.

In an embodiment with an optical object detection mode, an optical image may be captured to determine if an object is present. The optical image may be captured by an optical image sensor. In various embodiment an optical image sensor may be a sensor or may be part of an optical camera. The optical image sensor may capture an image, which may be used by the indicia reader 102 to detect a change in the field of view to detect an object. For example, by comparing an image captured at a first time and an image captured at a second time, the indicia reader 102 may detect a change in the scene and/or detect an object having entered the scene.

While the optical object detection mode may include using illumination to illuminate a scene, the optical object detection mode may also include not using illumination and instead rely on ambient light to illuminate the field of view. For example, an optical object detection mode may use illumination for a period of time and then deactivate or turn off illumination if an object is not detected. Such a deactivation or turning off the illumination used with optical object detection may be part of a low-power mode. Alternatively or additionally, the usage of illumination may be based on an amount of ambient light in an environment.

In various embodiments, one or more illumination object detection modes may be operated in parallel with the optical detection mode. For example, a short range illumination object detection mode may be operated in parallel with the optical detection mode. The parallel activation may also assist with transitioning between the illumination object detection mode and the optical object detection mode. Utilizing parallel modes may increase efficacy of detecting objects that may otherwise be missed if the barcode scanner switched modes by stopping one mode and then starting another.

While not illustrated in FIG. 1, in various embodiments the indicia reader 102 may be connected to a fixed mounting, such as a base station, cradle, and/or the like. The indicia reader 102 and/or the fixed mounting may include one or more sensors that allow for a determination that the indicia reader 102 is in a fixed mounting. The one or more sensors may include a contact sensor or the like that may be associated with a determination the indicia reader 102 is in a fixed mount. Alternatively or additionally, one or more electrical contacts may be present that electrically couples the indicia reader 102 to the fixed mounting, which may allow for a signal to be transmitted to the indicia reader 102 to indicate it is in a fixed mounting. In various embodiments, operation in a fixed mounting may be referred to as a presentation mode, which may or may not be associated with an object being presented to the indicia reader 102.

While also not illustrated in FIG. 1, in various embodiments the indicia reader 102 may be coupled to and/or connected to additional imaging systems and/or connected devices. For example, the indicia reader 102, after capturing and image and/or decoding an indicia may transmit indicia imaging data to a connected device. As such, various example embodiments of the present disclosure enable the indicia imaging data to be processed through a processor that is either part of the indicia reader or part of a connected device that is communicatively coupled to the indicia reader 102.

FIG. 2 illustrates an example block diagram of an example indicia reader in accordance with example embodiments of the present disclosure. For example, an indicia reader 102 may comprise an apparatus 200 as illustrated in FIG. 2. The apparatus 200 may include one or more components, circuitries, and/or modules that are in electronic commutation with one another. For example, the apparatus 200 may include object detection circuitry 202, imaging circuitry 204, a memory 208, a processor 210, and communications circuitry 212 that are all in electronic communication with one another, such as via a system bus 206. In some embodiments, the system bus 206 may refer to a computer bus that connects these components so as to enable data transfer and communications between these components, circuitries, and/or modules.

The object detection circuitry 102 may include one or more components for detecting an object, such as via one or more operations described herein. The object detection circuity 202 may include one or more illumination sources 222, one or more illumination sensors 224, and/or one or more optical image sensors 226. Examples of the illumination source(s) may include, but are not limited to, LEDS and/or laser diodes (e.g., violet laser diodes, visible laser diodes, edge-emitting laser diodes, surface-emitting laser diodes, and/or the like). In various embodiments, the optical image sensor 226 may be dedicated to the object detection circuitry. In such embodiments, imaging circuitry 204 may contain a separate optical image sensor for capturing an image for decoding (not illustrated). Alternatively or additionally, the optical image sensor 226 may be shared with the imaging circuitry 204.

In various embodiments, the illumination source(s) 222 may include one or more infrared light sources (e.g., infrared LEDs) and the illumination sensors 224 may include one or more photodiodes for detecting infrared light. In various embodiments, the illumination sensor 224 may detect only infrared light. Alternatively or additionally, an illumination sensor 224 capable of detecting more than only infrared light may be used to detect infrared light in addition to other wavelengths of light, such as detecting visible and/or ultraviolet light in addition to the infrared light. For example, a photodiode may be used to detect light, including infrared light. One or more filters may be used in the illumination sensor 224 to allow only a certain wavelength of light to pass, such as infrared light, or to diminish an amount of light that is not of a certain wavelength.

In various embodiments, an illumination sensor 224 may be dedicated to the object detection circuitry 202. Alternatively or additionally, one or more illumination sensors 224 may be shared between the object detection circuitry 202 and one or more other components or circuitries of the apparatus 200. For example, an illumination sensor 224 may detect reflections 122 and 132 during object detection and also used for detecting a level of ambient light before the imaging circuitry 204 may capture an image.

The object detection circuitry 202 may also include a dedicated processor (not illustrated). Alternatively or additionally, various embodiments may utilize a processor (e.g., 210) that is not dedicated to the object detection circuitry 202. The processor associated with operations of the object detection circuitry 202 may be calibrated to adjust one or more sensitivities associated with one or more ranges described herein. The processor may also generate one or more signals utilized by the object detection circuitry 202 to cause an illumination source 222 to generate light (e.g., infrared light pulse).

The illumination sensor 224, such as a photodiode, may receive reflections (e.g., 122, 132). The illumination sensor 224 may generate an electrical signal based on the reflections, and the signal may be transmitted from the illumination sensor 224 to, among other things, the processor associated with operations of the object detection circuitry 202. This processor may determine, based on this signal, if an object is present and to proceed with one or more other operations described herein, such as scanning an indicia.

In some embodiments, the imaging circuitry 204 may comprise one or more imaging sensors including, but are not limited to, a color or monochrome 1D or 2D Charge Coupled Device CCD), Complementary Metal-Oxide-Semiconductor (CMOS), N-channel Metal-Oxide-Semiconductor (NMOS), P-channel Metal-Oxide-Semiconductor (PMOS), Charge Injection Device (CID) or Charge Modulation Device (CMD) solid state image sensor, and/or the like. In some embodiments, the imaging circuitry 204 may include one or more imaging optics that define a field of view for capturing an image of indicia and generating indicia imaging data.

In some embodiments, the imaging circuitry 204 may also include one or more illumination sources and one or more illuminating optics assemblies configured to illuminate the field(s) of view of the indicia reader 102, so as to improve the quality of the captured indicia imaging data. Examples of illuminating optics assemblies may include, but are not limited to, one or more lenses, diffusers, wedges, reflectors, or a combination of such elements, for directing light from illumination source in the direction of the field of view.

In various embodiments the object detection circuitry 202 may be completely separate from the imaging circuitry 204. Alternatively, in various embodiments one or more components of the objection detection circuitry 202 may be shared with the imaging circuitry 204 and vice-versa.

Processor 210 may control the apparatus 202, including the object detection circuitry 202 and/or the imaging circuitry 204. In some embodiments, each of the object detection circuitry 202 and the imaging circuitry 204 may include one or more dedicated processors for, respectively, object detection and imaging. Such dedicated processors may be in communication with and/or may be controlled by processor 210. For example, the processor 210 may transmit electronic instructions to the object detection circuitry 202 via the system bus 206 to trigger object detection. As another example, the processor 210 may transmit electronic instructions to the imaging circuitry 204 to perform one or more operations associated with capturing an image, including illuminating the field of view of the indicia reader 102 and capturing an image of an object 120 with an indicia 110. The processor 210 may also decode the indicia 110 in a captured image.

The processor 210 may be embodied in a number of different ways and may, for example, include one or more processing devices configured to perform independently. Additionally, or alternatively, the processor 210 may include one or more processors configured in tandem via a bus to enable independent execution of instructions, pipelining, and/or multithreading. This may include a single core processor, a multi-core processor, multiple processors internal to the apparatus, and/or remote or "cloud" processors.

For example, the processor 210 may be embodied as one or more complex programmable logic devices (CPLDs), microprocessors, multi-core processors, co-processing entities, application-specific instruction-set processors (ASIPs), and/or controllers. Further, the processor 210 may be embodied as one or more other processing devices or circuitry. Thus, the processor 210 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processor 210 may be configured for a particular use or configured to execute instructions stored in volatile or non-volatile media or otherwise accessible to the processor 210. As such, whether configured by hardware or computer program products, or by a combination thereof, the processor 210 may be capable of performing steps or operations according to embodiments of the present disclosure when configured accordingly.

In an example embodiment, the processor 210 may be configured to execute instructions stored in the memory 208 or otherwise accessible to the processor. Alternatively, or additionally, the processor 210 may be configured to execute hard-coded functionality. As such, whether configured by hardware or software methods, or by a combination thereof, the processor may represent an entity (e.g., physically embodied in circuitry) capable of performing operations according to an embodiment of the present disclosure while configured accordingly. Alternatively, as another example, when the processor 210 is embodied as an executor of software instructions, the instructions may specifically configure the processor to perform the algorithms and/or operations described herein when the instructions are executed.

In some embodiments, the memory 208 may be non-transitory and may include, for example, one or more volatile and/or non-volatile memories. In other words, for example, the memory 208 may be an electronic storage device (e.g., a computer readable storage medium). The memory 208 may be configured to store information, data, content, applications, instructions, or the like, for enabling the apparatus 200 to carry out various functions in accordance with example embodiments of the present disclosure. In this regard, the memory 208 may be preconfigured to include computer-coded instructions (e.g., computer program code), and/or dynamically be configured to store such computer-coded instructions for execution by the processor 210.

In an example embodiment, the apparatus 200 further includes a communications circuitry 212 that may enable the apparatus 200 to transmit data and/or information to other devices through a communication network. The communications circuitry 212 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 212 may include, for example, a network interface for enabling communications with a wired or wireless communication network. For example, the communications circuitry 212 may include one or more circuitries, network interface cards, antennae, buses, switches, routers, modems, and supporting hardware and/or software, or any other device suitable for enabling communications via a network. Additionally, or alternatively, the communication interface may include the circuitry for interacting with the antenna(s) to cause transmission of signals via the antenna(s) or to handle receipt of signals received via the antenna(s). In various embodiments, the communications circuitry 212 may include one or more connections to one or more connected devices, such as additional sensors, indicia readers 102, networks, servers, and the like.

In some embodiments, the apparatus 200 may include the input/output circuitry 214 that may, in turn, be in communication with the processor 210 to provide output to the user and, in some embodiments, to receive an indication of a user input. The input/output circuitry 214 may comprise an interface, a mobile application, a kiosk, or the like. In some embodiments, the input/output circuitry 214 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 208). In some embodiments, the input/output circuitry 214 may include a trigger, button, and/or sensor that may allow for a user to instruct the indicia reader 102 to perform an operation, (e.g., to capture an image of indicia 110). Additionally, some embodiments may include input/output circuitry 214 such that a user may instruct the indicia reader 102 to select one of multiple settings, to select one or configure one of multiple components and/or circuitries to utilize, and/or to transmit data and/or information to another device.

In some embodiments, the apparatus 200 may include a display 216 that may, in turn, be in communication with the processor 210 to display user interfaces (such as, but not limited to, display of indicia or decoded indicia). The display 216 may include a liquid crystal display (LCD), a light-emitting diode (LED) display, a plasma (PDP) display, a quantum dot (QLED) display, and/or the like.

Example Operations

In some example embodiments, and according to the operations described herein, an indicia reader 102 may automatically switch object detection modes to detect an object 120 and decode an indicia 110 on the object 120. While the following flowcharts and related description includes multiple operations, it is readily appreciated that some of the following operations may be omitted, some of the operations may be repeated or iterated, and that additional operations may be included. Additionally, the order of operations should not be interpreted as limiting as the order of these operations may be varied.

FIG. 3 illustrates an example process for detecting an object in accordance with example embodiments of the present disclosure. The example process illustrated in FIG. 3 includes two infrared objection detection modes and an optical object detection mode. The two infrared objection detection modes are, respectively, associated with a first range of a long range and a second range of a short range. It will be readily appreciated that additional ranges may be included, such as one or more ranges between the first range (i.e., long range) and the second range (e.g., short range).

For example, a user may of an indicia reader 102 may select an option associated with the number of ranges.

At operation 302, an object detection configuration may be determined. An indicia reader 102 may determine an object detection configuration, which may include the number of ranges for the indicia reader 102. For example, and as illustrated in FIG. 3, there may be a first range of a long range and a second range of a short range. Each of the ranges may be associated with an infrared object detection modes (e.g., a long range infrared object detection mode, a short range infrared object detection mode, etc.).

Additionally or alternatively, the object detection configuration may include a time period for each of the range. For example, there may be a first time period associated with the first range and a second time period associated with the second range. The time periods may be used by the indicia reader 102 as described herein.

In various embodiments, the determination of an object detection configuration may include determining if the indicia reader 102 is in a handheld mode or a presentation mode. This determination may be based on a signal generated by one or more sensors, such as a contact sensor that may be activated or generate a signal when the indicia reader 102 is placed in a cradle, base station, or the like.

At operation 304, a determination is made if to switch to long range infrared object detection mode or short range infrared object detection mode. In various embodiments with different numbers of ranges, the determination may be to which of the ranges to switch to. If a determination of a long range infrared object detection mode is made then the indicia reader 102 may proceed to operation 306. If a determination of a long range infrared object detection mode is made then the indicia reader 102 may proceed to operation 310.

In various embodiments, the determination may be based on a current detection mode or last detection mode that may be associated with a detection mode utilized by the indicia reader 102 before a trigger is actuated by a user, which is further described herein.

At operation 306, the indicia reader 102 switches to a long range infrared object detection mode. In the long range detection mode the indicia reader 102 may utilize an illumination source 222 to generate infrared light and an illumination sensor 224 to detect reflections from one or more objects in its field of view. An object may be detected if a reflection (e.g., 122, 132, etc.) is above a first threshold.

At operation 308, the indicia reader 102 may detect an object for a first period of time. For example, a first period of time may be 15 seconds. The detection of an object for a first period of time may be indicative of a background and not an object 120 including an indicia 110. Additionally, the detection of a background in the long range may be based on a signal from an illumination sensor 224 being above the first threshold for the first period of time. After detecting a signal above the first threshold for the first time period, the indicia reader 102 may determine an object detected is a background and proceed to the next operation.

At operation 310, the indicia reader 102 may switch to a short range infrared object detection mode. The switch to the short range infrared object detection mode may be based on the long range detection mode detecting a signal from an illumination source 224 being above a first threshold for a first period of time. In the short range detection mode the indicia reader 102 may utilize an illumination source 222 to generate infrared light (or continue to generate infrared light) and an illumination sensor 224 to detect reflections from one or more objects in its field of view. An object may be detected if a signal generated based on a reflection (e.g., 122, 132, etc.) is above a second threshold. The second threshold may be higher than the first threshold. If the reflections (e.g., 132) received are not higher than the second threshold then this may, in some embodiments, disregard a background object 130. In various embodiments, the indicia reader 102 may not detect an object 120 in the short range detection mode while an object of a background 130 was detected in the long range detection mode. In such situations, the indicia reader 102 may continue to operate in the short range detection mode until an object (e.g., 120, 130) is detected.

At operation 312, the indicia reader 102 may detect an object for a second period of time. The second period of time may be shorter, longer, or the same as the first period of time. For example, a second period of time may be 10, 15, or 45 seconds. The detection of an object for a second period of time may be indicative of a background and not an object 120 including an indicia 110. Additionally, the detection of an object in the short range may be based on a signal from an illumination sensor 224 being at or above the second threshold for the second period of time. After detecting a signal above the second threshold for the second time period, the indicia reader 102 may proceed to the next operation(s).

At operation 314, the indicia reader 102 may switch to an optical object detection mode. In various embodiments, the infrared object detection modes may result in reflections from background objects 130. The continued use of infrared object detection modes may, among other things, be generating false signals that an object is present. Thus, the indicia reader 102 may switch to the optical object detection mode, which may utilize an optical image sensor 226 to detect when an object 120 enters into the field of view of the indicia reader 102. The optical image sensor 226 may be utilized to determine if and/or when there is a change in the field of view, such as an object 120 entering the field of view. In various embodiments the determination of a change in the field of view may utilize an optical object detection mode that is associated with a low-power setting. This low-power optical object detection mode may be of a lower resolution than one or more other modes of an image sensor that may generate higher resolution images. In such embodiments, an optical object detection mode utilizing a low-power mode of the optical image sensor 226 may further reduce power consumption.

In various embodiments, if a field of view does not have sufficient ambient light for an optical object detection mode, one or more illumination sources may generate light. These one or more illumination sources may be any illumination source of the indicia reader 102, including one or more illumination sources of the object detection circuitry 202 and/or of the imaging circuitry 204. The determination to generate light from one of these illumination sources may be based on a signal received by an illumination sensor, such as illumination sensor 224, being below a threshold. In various embodiments, this illumination threshold may be based on a measurement of light other than infrared light (e.g., a measurement of light in the visible light spectrum).

At operation 316, the infrared objection detection modes may be deactivated. In various embodiments, this operation may done in parallel with operation 314, before operation 314, after operation 314, or may be omitted. Deactivating the infrared object detection modes may include deactivating, powering down, putting to sleep, or otherwise not using one or more components, modules, and/or circuitries associated with the infrared object detection modes, such as the illumination source 222 and/or illumination sensor 224. It may also include ceasing one or more operations associated with comparing signals to thresholds and/or the determination if one or more period of time has expired. Such deactivations may, among other things, lower power consumption.

At operation 318, an object detection signal may be generated. An object detection signal may be generated based on the optical object detection mode detecting an object. The object detection signal may be generated by, for example, the object detection circuitry 202 and transmitted to one or more other components, modules, and/or circuitry of the indicia reader 102. For example, the object detection signal may be transmitted to a processor 210, which may execute one or more instructions based on the object detection signal, such as to capture an image of an object 120 including an indicia 110 and to decode the indicia 110.

In various embodiments, after the detection of an object and generation of an object detection signal, the indicia reader 102 may return to one or more prior operations. This may include returning to determining a next configuration. Such a configuration may be returning to a long range infrared object detection mode. Alternatively, it may be returning to a short range detection mode. In yet another alternative, it may include returning to a third infrared object detection mode not illustrated in FIG. 3.

In various embodiments, one or more of the infrared object detection modes may also generate an object detection signal. Such an object detection signal from an infrared object detection mode may also, as illustrated in FIG. 3, cause the indicia reader to return to a previously operation to detect another object.

In various embodiments, the object detection mode 102 that the indicia reader 102 proceeds to may depend on the current and/or last object detection mode the indicia reader 102 was operating in. For example, an indicia reader 102 may include a trigger that may be actuated by a user, such as to cause the indicia reader 102 to operate to capture an image of an object 120. The actuation of the trigger by a user may occur whether the indicia reader 102 is in an handheld mode or presentation mode. The actuation of the trigger may interrupt an object detection mode, such as during one of the time periods of FIG. 3. When a trigger is actuated, the indicia reader 102 may determine a current and/or last object detection mode. Once an image is captured of an object in response to the actuation of the trigger by the user, the indicia reader 102 may return to the current and/or last object detection mode. In various embodiments, a period of time associated with the current and/or last object detection mode may be reset. Additionally or alternatively, another time period may need to pass before returning to the current and/or last object detection mode. This time period may allow for a user to continue presenting objects. In such an example, the user may be presenting one or more objects 120 in front of a background 130 but the field of view of the indicia reader 102 may otherwise be unchanged. To lower power consumption, returning to the current and/or last objection detection mode may allow for the indicia reader 102 to not consume power while iterating through other objection detection modes. Alternatively or additionally, when returning to the current and/or last object detection mode, the indicia reader 102 may iterate through each other object detection mode associated with a longer range but using a reduced time period before returning to the current and/or last objection detection mode.

In various embodiments, the indicia reader 102 may be receiving one or more reflections 132 of a background 130 and then stop receiving the reflections 132, which may cause the indicia reader 102 to return to a first or earlier object detection mode. For example, an indicia reader 102 may have progressed through operations 302 to 310, including switching to a short range infrared object detection mode with a background 130 being detected generating a signal associated with the reflections 132 from the background 130 being above a second threshold. The signal, however, may fall below the second threshold before the expiration of the second time period. This may be due to, for example, the background 130 being removed and/or changing. The indicia reader 102 may then proceed or return to a prior operation, such as switching to a long range infrared object detection mode (e.g., 306) or determining object detection configuration (e.g., 302).

As another example, in various embodiments an indicia reader 102 may have progressed through operations 302 to 312 with receiving reflections 132 from a background 130 in a short range for longer than the second time period. The indicia reader 102 may not have deactivated the short range infrared object detection mode. The indicia reader 102 may switch an optical detection mode (e.g., operation 314) while also keeping active the second object detection mode of the short range infrared object detection mode. The signal generated from the reflections 132 from the background 130 from the short range infrared object detection mode may, however, fall below the second threshold while both the optical object detection mode and the short range infrared object detection mode are active. This may be due to, for example, the background 130 being removed and/or changing. The indicia reader 102 may then proceed to or return to a prior operation, such as switching to a long range infrared object detection mode (e.g., 306) or determining object detection configuration (e.g., 302), which may also include switching one or more other object detections mode off (e.g., deactivating the optical object detection mode).

FIG. 4 illustrates an example process for operating an indicia reader in accordance with example embodiments of the present disclosure. In some embodiments, an indicia reader 102 may capture, decode, and transmit indicia imaging data or indicia information as described in FIG. 4. In some embodiments, one or more operations may be omitted. Additionally, other operations may be added.

At operation 402, an object detection signal may be received. Receiving the object detection signal may trigger the process of capturing an image of an object and decoding an indicia. In some embodiments, the object detection signal may have been generated and transmitted from the object detection circuitry 202. Alternatively, in some embodiments, a user of an indicia reader 102 may have actuated a trigger to generate an object detection signal.

At operation 404, an object may be illuminated. With the detection of an object 120 indicated by the receipt of an object detection signal, the indicia reader 102 may illuminate the object 120. In various embodiments, the illumination of the object 120 may be performed by an illumination source. For example, the illumination source may generate a pulse of light to illuminate the object 120. This illumination source may be a common illumination source used by both objection detection circuitry 202 and imaging circuity 204. Alternatively, this illumination source may not be an illumination source associated with the object detection circuitry (e.g., infrared LED(s)), such as in embodiments where there are separate illumination source (e.g., visible light LED(s)) associated with the imaging circuitry 204.

At operation 406, the indicia reader 102 may capture an image. In some embodiments, once an object is detected in the field of view of the indicia reader 102, the indicia reader 102 may capture an image.

At operation 408, the indicia reader 102 may decode the indicia in the captured image. In some embodiments, the indicia reader 102 may decode an indicia, such as but not limited to a barcode or QR code, to generate indicia data. The indicia data may be provided to a user and/or to a connected device and/or system.

At operation 410, the indicia reader 102 may return to object detection mode. Having captured and decoded an indicia, the indicia reader 102 may return to detecting another object 120 so another indicia 110 may be decoded.

Operations and/or functions of the present disclosure have been described herein, such as in flowcharts. As will be appreciated, computer program instructions may be loaded onto a computer or other programmable apparatus (e.g., hardware) to produce a machine, such that the resulting computer or other programmable apparatus implements the operations and/or functions described in the flowchart blocks herein. These computer program instructions may also be stored in a computer-readable memory that may direct a computer, processor, or other programmable apparatus to operate and/or function in a particular manner, such that the instructions stored in the computer-readable memory produce an article of manufacture, the execution of which implements the operations and/or functions described in the flowchart blocks. The computer program instructions may also be loaded onto a computer, processor, or other programmable apparatus to cause a series of operations to be performed on the computer, processor, or other programmable apparatus to produce a computer-implemented process such that the instructions executed on the computer, processor, or other programmable apparatus provide operations for implementing the functions and/or operations specified in the flowchart blocks. The flowchart blocks support combinations of means for performing the specified operations and/or functions and combinations of operations and/or functions for performing the specified operations and/or functions. It will be understood that one or more blocks of the flowcharts, and combinations of blocks in the flowcharts, can be implemented by special purpose hardware-based computer systems which perform the specified operations and/or functions, or combinations of special purpose hardware with computer instructions.

While this specification contains many specific embodiments and implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

While operations and/or functions are illustrated in the drawings in a particular order, this should not be understood as requiring that such operations and/or functions be performed in the particular order shown or in sequential order, or that all illustrated operations be performed, to achieve desirable results. In certain circumstances, operations and/or functions in alternative ordering may be advantageous. In some cases, the actions recited in the claims may be performed in a different order and still achieve desirable results. Thus, while particular embodiments of the subject matter have been described, other embodiments are within the scope of the following claims.

While this specification contains many specific embodiment and implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are illustrated in the drawings in a particular order, this should not be understood as requiring that such operations be performed in the particular order shown or in sequential order, or that all illustrated operations be performed, to achieve desirable results. In certain circumstances, operations in alternative ordering may be advantageous. In some cases, the actions recited in the claims may be performed in a different order and still achieve desirable results.

The invention claimed is:

1. An indicia reader comprising at least one processor and at least one non-transitory memory comprising program code, wherein the at least one non-transitory memory and the program code are configured to, with the at least one processor, cause the indicia reader to:

determine a first infrared object detection mode of a plurality of infrared object detection modes for the indicia reader, wherein each infrared object detection mode is associated with a respective threshold and a respective time period;

switch to the first infrared object detection mode, wherein the first infrared object detection mode is associated with a first range that is associated with a first threshold of infrared illumination from an infrared illumination source received at an infrared illumination sensor;

determine if an object is detected when the infrared illumination is above the first threshold of illumination for a first period of time;

switch, based on a failure of detection of the object when the infrared illumination is above the first threshold of illumination for the first period of time, to a second infrared object detection mode of the plurality of infrared object detection modes, wherein the second infrared object detection mode is associated with a second range that is associated with a second threshold of infrared illumination from the infrared illumination source received at the infrared illumination sensor;

determine if the object is detected when the infrared illumination is above the second threshold of illumination for a second period of time;

switch, based on the failure of detection of the object when the infrared illumination is above the second threshold of illumination for the second period of time, to an optical object detection mode;

deactivate, after the switch to the optical object detection mode, the infrared illumination source; and detect, after the deactivating, via an optical image sensor, the object comprising an indicia.

2. The indicia reader of claim 1, wherein the at least one non-transitory memory and the program code are further configured to, with the at least one processor, cause the indicia reader to:

activate, based on the detection of the object comprising the indicia in the optical object detection mode, the infrared illumination source and the infrared illumination sensor; and switch to the first infrared object detection mode.

3. The indicia reader of claim 1, wherein the first range is a longer distance than the second range.

4. The indicia reader of claim 1, wherein the at least one non-transitory memory and the program code are further configured to, with the at least one processor, cause the indicia reader to:

capture, in response to a detection of the object, an image of the object including the indicia; and decode the indicia.

5. The indicia reader of claim 1, wherein the indicia reader further comprises a trigger; and wherein the at least one non-transitory memory and the program code are further configured to, with the at least one processor, cause the indicia reader to:

determine, responsive to an actuation of the trigger, a last object detection mode;

capture, responsive to the actuation of the trigger, an image; and switch, after capturing the image, to a last object detection mode.

6. The indicia reader of claim 1, wherein the plurality of infrared object detection modes includes a third infrared object detection mode; and wherein the at least one non-transitory memory and the program code are further configured to, with the at least one processor, cause the indicia reader to:

switch, prior to switching to the optical object detection mode and based on the failure of detection of the object when the infrared illumination is above the second threshold of illumination for the second period of time, to a third infrared object detection mode of the plurality of infrared object detection modes, wherein the third infrared object detection mode is associated with a third range that is associated with a third threshold of infrared illumination received at the infrared illumination sensor; and determine if the object is detected when the infrared illumination is above the third threshold of illumination via the infrared illumination sensor for a third period of time.

7. A computer-implemented method carried out by a computer, one or more infrared illumination sensors, and one or more optical image sensors, comprising:

determining a first infrared object detection mode of a plurality of infrared object detection modes for an indicia reader, wherein each infrared object detection mode is associated with a respective threshold and a respective time period;

switching to the first infrared object detection mode, wherein the first infrared object detection mode is associated with a first range that is associated with a first threshold of infrared illumination from an infrared illumination source received at an infrared illumination sensor;

determining if an object is detected when the infrared illumination is above the first threshold of illumination for a first period of time;

switching, based on a failure of detection of the object when the infrared illumination is above the first threshold of illumination for the first period of time, to a second infrared object detection mode of the plurality of infrared object detection modes, wherein the second infrared object detection mode is associated with a second range that is associated with a second threshold of infrared illumination from the infrared illumination source received at the infrared illumination sensor;

determining if the object is detected when the infrared illumination is above the second threshold of illumination via the infrared illumination sensor for a second period of time;

switching, based on the failure of detection of the object when the infrared illumination is above the second threshold of illumination for the second period of time, to an optical object detection mode;

deactivating, after the switch to the optical object detection mode, the infrared illumination source; and detecting, after the deactivating, via an optical image sensor, the object comprising an indicia.

8. The computer-implemented method of claim 7 further comprising:

activating, based on the detection of the object comprising the indicia in the optical object detection mode, the infrared illumination source and the infrared illumination sensor; and switching to the first infrared object detection mode.

9. The computer-implemented method of claim 7, wherein the first range is a longer distance than the second range.

10. The computer-implemented method of claim 7 further comprising:

capturing, in response to a detection of the object, an image of the object including the indicia; and decoding the indicia.

11. The computer-implemented method of claim 7 further comprising:

determining, responsive to an actuation of a trigger of the indicia reader, a last object detection mode;

capturing responsive to the actuation of the trigger, an image; and switching, after capturing the image, to a last object detection mode.

12. The computer-implemented method of claim 7, wherein the plurality of infrared object detection modes includes a third infrared object detection mode; and wherein the computer-implemented method further comprises:

switching, prior to switching to the optical object detection mode and based on the detection of the second threshold of illumination for the second period of time, to a third infrared object detection mode of the plurality of infrared object detection modes, wherein the third infrared object detection mode is associated with a third range that is associated with a third threshold of infrared illumination received at the infrared illumination sensor; and determine if the object is detected when the infrared illumination is above the third threshold of illumination via the infrared illumination sensor for a third period of time.

13. A computer program product comprising at least one non-transitory computer-readable storage medium having computer-readable program code portions stored therein, the computer-readable program code portions comprising an executable portion executable on a computer, one or more infrared sensors, and one or more optical image sensors, configured to:

determine a first infrared object detection mode of a plurality of infrared object detection modes for an indicia reader, wherein each infrared object detection mode is associated with a respective threshold and a respective time period; switch to the first infrared object detection mode, wherein the first infrared object detection mode is associated with a first range that is associated with a first threshold of infrared illumination from an infrared illumination source received at an infrared illumination sensor;

determine an object is detected when the infrared illumination is above the first threshold of illumination via the infrared illumination sensor for a first period of time;

switch, based on a failure of detection of the object when the infrared illumination is above the first threshold of illumination for the first period of time, to a second infrared object detection mode of the plurality of infrared object detection modes, wherein the second infrared object detection mode is associated with a second range that is associated with a second threshold of infrared illumination from the infrared illumination source received at the infrared illumination sensor;

determine if the object is detected when the infrared illumination is above the second threshold of illumination via the infrared illumination sensor for a second period of time;

switch, based on a failure of detection of the object when the infrared illumination is above the second threshold of illumination for the second period of time period of each respective infrared object mode, to an optical object detection mode; and deactivate, after the switch to the optical object detection mode, the infrared illumination source; and detect, after the deactivating, via an optical image sensor, the object comprising an indicia.

14. The computer program product of claim 13, wherein the computer-readable program code portions further comprise the executable portion configured to:

activate, based on the detection of the object comprising the indicia in the optical object detection mode, the infrared illumination source and the infrared illumination sensor; and switch to the first infrared object detection mode.

15. The computer program product of claim 13, wherein the first range is a longer distance than the second range.

16. The computer program product of claim 13, wherein the computer-readable program code portions further comprise the executable portion configured to:

capture, in response to a detection of the object, an image of the object including the indicia; and decode the indicia.

17. The computer program product of claim 13, wherein the computer-readable program code portions further comprise the executable portion configured to:

determine, responsive to an actuation of a trigger of the indicia reader, a last object detection mode;

capture responsive to the actuation of the trigger, an image; and switch, after capturing the image, to the last object detection mode.

* * * * *